US012145353B1

(12) United States Patent
Chen et al.

(10) Patent No.: US 12,145,353 B1
(45) Date of Patent: Nov. 19, 2024

(54) COATING APPARATUS AND COATING METHOD FOR SUBSTRATE WITH CURVED SURFACE

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventors: Chien Cheng Chen, Guangdong (CN); Po Lun Chen, Guangdong (CN); Yun Pei Chen, Guangdong (CN)

(73) Assignees: Interface Technology (ChengDu) Co., Ltd., Sichuan (CN); Interface Optoelectronics (ShenZhen) Co., Ltd., Guangdong (CN); General Interface Solution Limited, Miaoli County (TW)

( * ) Notice: Subject to any disclaimer, the term of this patent is extended or adjusted under 35 U.S.C. 154(b) by 0 days.

(21) Appl. No.: 18/459,433

(22) Filed: Sep. 1, 2023

(30) Foreign Application Priority Data

Jul. 25, 2023 (CN) ........................ 202310920100.5

(51) Int. Cl.
*B41F 16/00* (2006.01)
*B41F 17/30* (2006.01)

(52) U.S. Cl.
CPC ............ *B41F 16/008* (2013.01); *B41F 17/30* (2013.01)

(58) Field of Classification Search
CPC .. B41F 16/008; B41F 6/0073; B41F 16/0086; B41F 17/00; B41F 17/001; B41F 17/002; B41F 17/003; B41F 17/006; B41F 17/08; B41F 17/10; B41F 17/18; B41F 17/20; B41F 17/22; B41F 17/24; B41F 17/26; B41F 17/30; B41F 17/32; A63B 45/02
See application file for complete search history.

(56) References Cited

FOREIGN PATENT DOCUMENTS

CN 214637755 U * 11/2021

* cited by examiner

*Primary Examiner* — Christopher E Mahoney
*Assistant Examiner* — Marissa Ferguson-Samreth
(74) *Attorney, Agent, or Firm* — CKC & Partners Co., LLC

(57) ABSTRACT

A coating apparatus for a substrate with a curved surface includes a platform, a coating assembly, a carrying stage, and a transfer printing assembly. The coating assembly includes a push frame mounted on the platform and a coating wire rod disposed on the push frame. The push frame can push the coating wire rod to scrape a glue on a flat surface of the platform to form a glue layer on the flat surface. The carrying stage can hold the substrate. The transfer printing assembly includes a carrier and an elastic transfer printing head. The carrier is horizontally movable above the platform and the carrying stage. The elastic transfer printing head is disposed on a bottom of the carrier and is vertically movable, and can attach the glue layer on the flat surface and press against the curved surface to transfer the attached glue layer to the curved surface.

21 Claims, 7 Drawing Sheets

COATING APPARATUS AND COATING METHOD FOR SUBSTRATE WITH CURVED SURFACE

RELATED APPLICATIONS

This application claims priority to China Application Serial Number 202310920100.5, filed Jul. 25, 2023, which is herein incorporated by reference.

BACKGROUND

Field of Invention

The present invention relates to a coating technology, and more particularly, to a coating apparatus and a coating method for a substrate with a curved surface.

Description of Related Art

With the flourishing development of mobile devices, display panels and touch panels have begun to pursue curved surfaces. Therefore, how to evenly coat a polyimide (PI) solution of the display panel and an optical adhesive of the touch panel on a substrate with a curved surface becomes very critical.

Currently, the common coating apparatuses include a spin coater and a blade coater. When the spin coater is applied to the coating of a concave substrate, there are problems of low glue utilization and poor uniformity. The spin coater cannot be applied to perform a coating operation on a convex substrate. The blade coater cannot be applied to perform a coating operation on the concave substrate and the convex substrate. Therefore, the conventional coating apparatuses, such as the spin coaters and the blade coaters can only perform coating operations on flat substrates. At present, there is no coating apparatus in the industry that can perform coating operations on both the concave substrates and the convex substrates.

SUMMARY

Therefore, one objective of the present disclosure is to provide a coating apparatus and a coating method for a substrate with a curved surface, in which a soft elastic transfer printing head can smoothly coat a glue layer on substrates with curved surfaces of different curvatures by transfer printing. Accordingly, the coating apparatus and the coating method for the substrate with the curved surface of the present disclosure can be used to perform coating operations on concave substrates and convex substrates.

According to the above objectives, the present disclosure provides a coating apparatus for a substrate with a curved surface. The coating apparatus includes a platform, a coating assembly, a carrying stage, and a transfer printing assembly. The platform has a flat surface. The coating assembly is adjacent to the platform, in which the coating assembly includes a push frame and a coating wire rod. The push frame is disposed on the platform. The coating wire rod is disposed on the push frame. The push frame is configured to push the coating wire rod to scrape a glue on the flat surface so as to form a glue layer on the flat surface. The carrying stage is adjacent to a first side of the flat surface and is configured to hold the substrate with the curved surface. The transfer printing assembly includes a carrier and an elastic transfer printing head. The carrier is horizontally movable above the platform and the carrying stage. The elastic transfer printing head is disposed on a bottom of the carrier and is vertically movable, and is configured to attach the glue layer on the flat surface and press against the curved surface of the substrate to transfer the attached glue layer to the curved surface.

According to one embodiment of the present disclosure, a gap of the coating wire rod is 1 μm to 20 μm.

According to one embodiment of the present disclosure, the coating assembly further includes a first driving device. The first driving device is connected to the push frame and is configured to drive the push frame to move above the flat surface.

According to one embodiment of the present disclosure, the first driving device is a pneumatic cylinder.

According to one embodiment of the present disclosure, the carrying stage is a vacuum stage.

According to one embodiment of the present disclosure, a size and a shape of the elastic transfer printing head substantially correspond to a size and a shape of the curved surface of the substrate.

According to one embodiment of the present disclosure, the elastic transfer printing head has a convex arc surface.

According to one embodiment of the present disclosure, a material of the elastic transfer printing head is rubber, silicone, or polyurethane (PU).

According to one embodiment of the present disclosure, the transfer printing assembly further includes a second driving device and a third driving device. The second driving device is connected to the carrier, and is configured to drive the carrier to drive the elastic transfer printing head. The third driving device is disposed on the carrier and is connected to the elastic transfer printing head. The third driving device is configured to drive the elastic transfer printing head to move vertically.

According to one embodiment of the present disclosure, each of the second driving device and the third driving device is a pneumatic cylinder.

According to the above objectives, the present disclosure provides a coating method for a substrate with a curved surface. In this method, a carrying stage is used to hold the substrate with the curved surface. A preset amount of a glue is dropped on a first side of a flat surface of a platform, in which the first side of the flat surface is adjacent to the carrying stage. A coating wire rod is used to scrap the glue from the first side of the flat surface to a second side, which is opposite to the first side, so as to form a glue layer on the flat surface. An elastic transfer printing head is used to attach the glue layer on the flat surface. The elastic transfer printing head attached with the glue layer is moved to a top of the substrate. The elastic transfer printing head is pressed against the curved surface of the substrate, so as to transfer the glue layer attached on the elastic transfer printing head to the curved surface.

According to one embodiment of the present disclosure, using the carrying stage to hold the substrate further includes using a vacuum adsorption method to hold the substrate, and controlling a vacuum value of the carrying stage to be greater than −65 kPa.

According to one embodiment of the present disclosure, using the coating wire rod to scrap the glue comprises controlling the coating wire rod to move at a speed of 0.1 mm/s to 30 mm/s.

According to one embodiment of the present disclosure, using the elastic transfer printing head to attach the glue layer on the flat surface includes controlling a dipping speed at 0.1 cm/s to 10 cm/s.

According to one embodiment of the present disclosure, moving the elastic transfer printing head attached with the glue layer to the top of the substrate comprises controlling a horizontal moving speed of the elastic transfer printing head at 0.1 mm/s to 30 mm/s.

According to one embodiment of the present disclosure, moving the elastic transfer printing head attached with the glue layer to the top of the substrate includes controlling a vertical moving speed of the elastic transfer printing head at 0.1 mm/s to 30 mm/s.

According to one embodiment of the present disclosure, transferring the glue layer attached on the elastic transfer printing head to the curved surface includes controlling a transferring speed of the elastic transfer printing head at 0.1 cm/s to 10 cm/s.

According to one embodiment of the present disclosure, transferring the glue layer attached on the elastic transfer printing head to the curved surface includes applying a downward air pressure to the elastic transfer printing head, and the downward air pressure is 4 $kgf/cm^2$ to 6 $kgf/cm^2$.

According to one embodiment of the present disclosure, when a viscosity of the glue is greater than 2000 mPa·s, a Shore A hardness of the elastic transfer printing head is greater than 150.

According to one embodiment of the present disclosure, when a size of the substrate is greater than 4900 mm, a Shore A hardness of the elastic transfer printing head is smaller than 50.

According to one embodiment of the present disclosure, performing the coating method includes controlling an ambient temperature to be less than 30 degrees Celsius, and a relative humidity of 40% to 80%.

The coating wire rod of the present disclosure can control the thickness of the glue layer, such that the thickness of the glue layer for each transfer can be consistent. In addition, the elastic transfer printing head can attach the glue layer formed by the coating wire rod, and can transfer the attached glue layer to the curved surface of the substrate smoothly. Therefore, the present disclosure can achieve coating operations on the substrate with the curved surface, such as a convex surface and a concave surface, and has advantages of high utilization of the glue and good uniformity of the glue layer.

BRIEF DESCRIPTION OF THE DRAWINGS

Aspects of the present disclosure are best understood from the following detailed description in conjunction with the accompanying figures. It is noted that in accordance with the standard practice in the industry, various features are not drawn to scale. In fact, dimensions of the various features can be arbitrarily increased or reduced for clarity of discussion.

DETAILED DESCRIPTION

Figure 1:
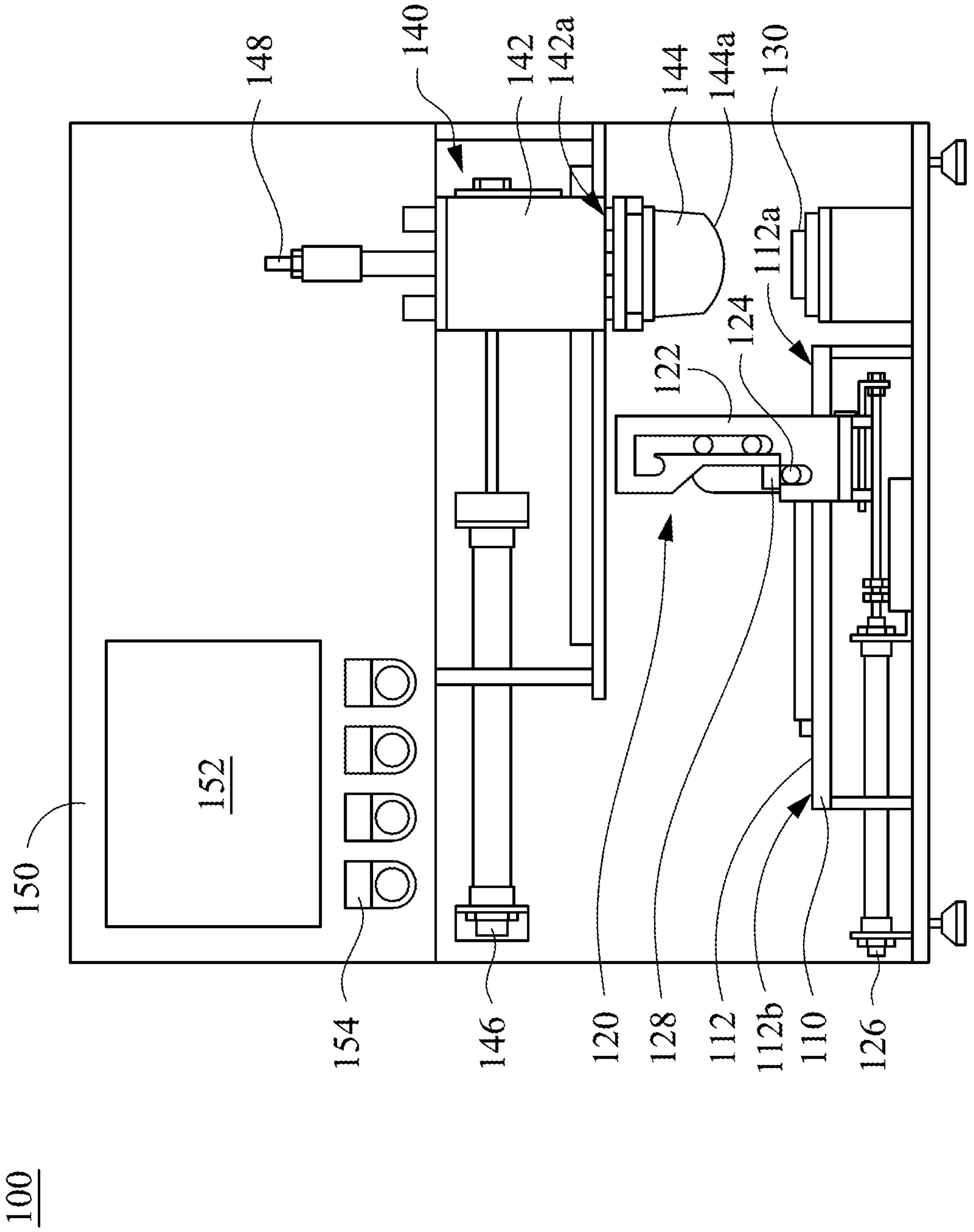
FIG. 1 is a side view of a coating apparatus for a substrate with a curved surface in accordance with one embodiment of the present disclosure.

The embodiments of the present disclosure are discussed in detail below. However, it will be appreciated that the embodiments provide many applicable concepts that can be implemented in various specific contents. The embodiments discussed and disclosed are for illustrative purposes only and are not intended to limit the scope of the present disclosure. All of the embodiments of the present disclosure disclose various different features, and these features may be implemented separately or in combination as desired.

In addition, the terms “first”, “second”, and the like, as used herein, are not intended to mean a sequence or order, and are merely used to distinguish elements or operations described in the same technical terms.

The spatial relationship between two elements described in the present disclosure applies not only to the orientation depicted in the drawings, but also to the orientations not represented by the drawings, such as the orientation of the inversion. Moreover, the terms “connected”, “electrically connected”, or the like between two components referred to in the present disclosure are not limited to the direct connection or electrical connection of the two components, and may also include indirect connection or electrical connection as required.

Referring to FIG. 1, FIG. 1 is a side view of a coating apparatus for a substrate with a curved surface in accordance with one embodiment of the present disclosure. A coating apparatus 100 for a substrate with a curved surface may mainly include a platform 110, a coating assembly 120, a carrying stage 130, and a transfer printing assembly 140. The platform 110 is a glue platform, and a glue layer can be formed on the platform 110 before transfer printing. The platform 110 has a flat surface 112, which facilitates the formation of a glue layer with a uniform thickness. The flat surface 112 has a first side **112*a* and a second side 112*b*, which are opposite to each other. For example, the platform 110** may be a glass platform, but the present disclosure is not limited thereto.

The coating assembly 120 is adjacent to the platform 110, and can perform a scrape coating operation on the flat surface 112 of the platform 110. Specifically, the coating assembly 120 may mainly include a push frame 122 and a coating wire rod 124. The push frame 122 is disposed on the platform 110. The coating wire rod 124 is disposed across the push frame 122 and is located above the flat surface 112 of the platform 110. The push frame 122 can push the coating wire rod 124 to move on the flat surface 112, such that the coating wire rod 124 can scrape a glue on the flat surface 112 and scrape the glue to form a glue layer on the flat surface 112.

Figure 2:
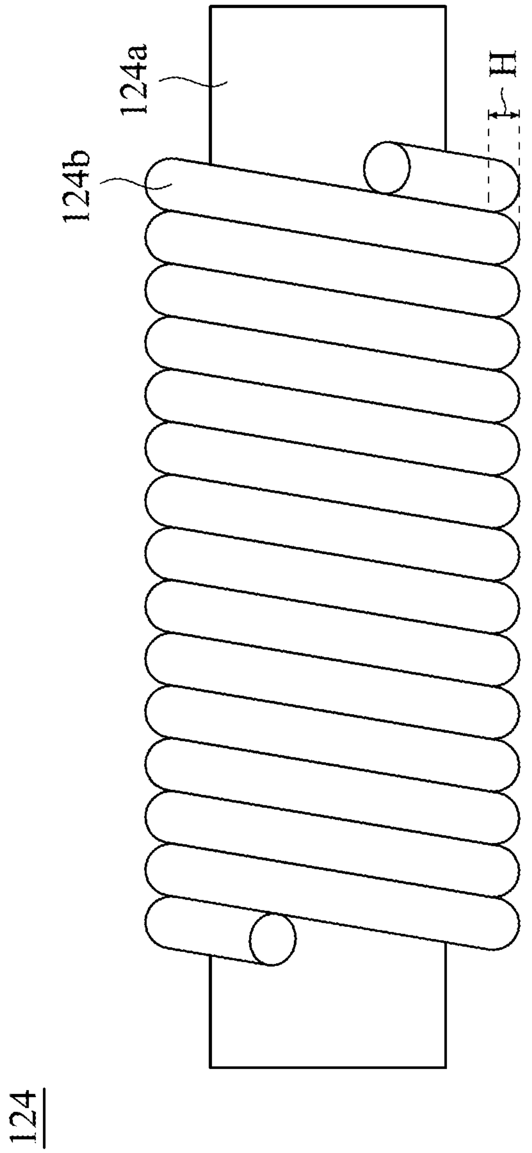
FIG. 2 is a side view of a coating wire rod in accordance with one embodiment of the present disclosure.
Figure 3:
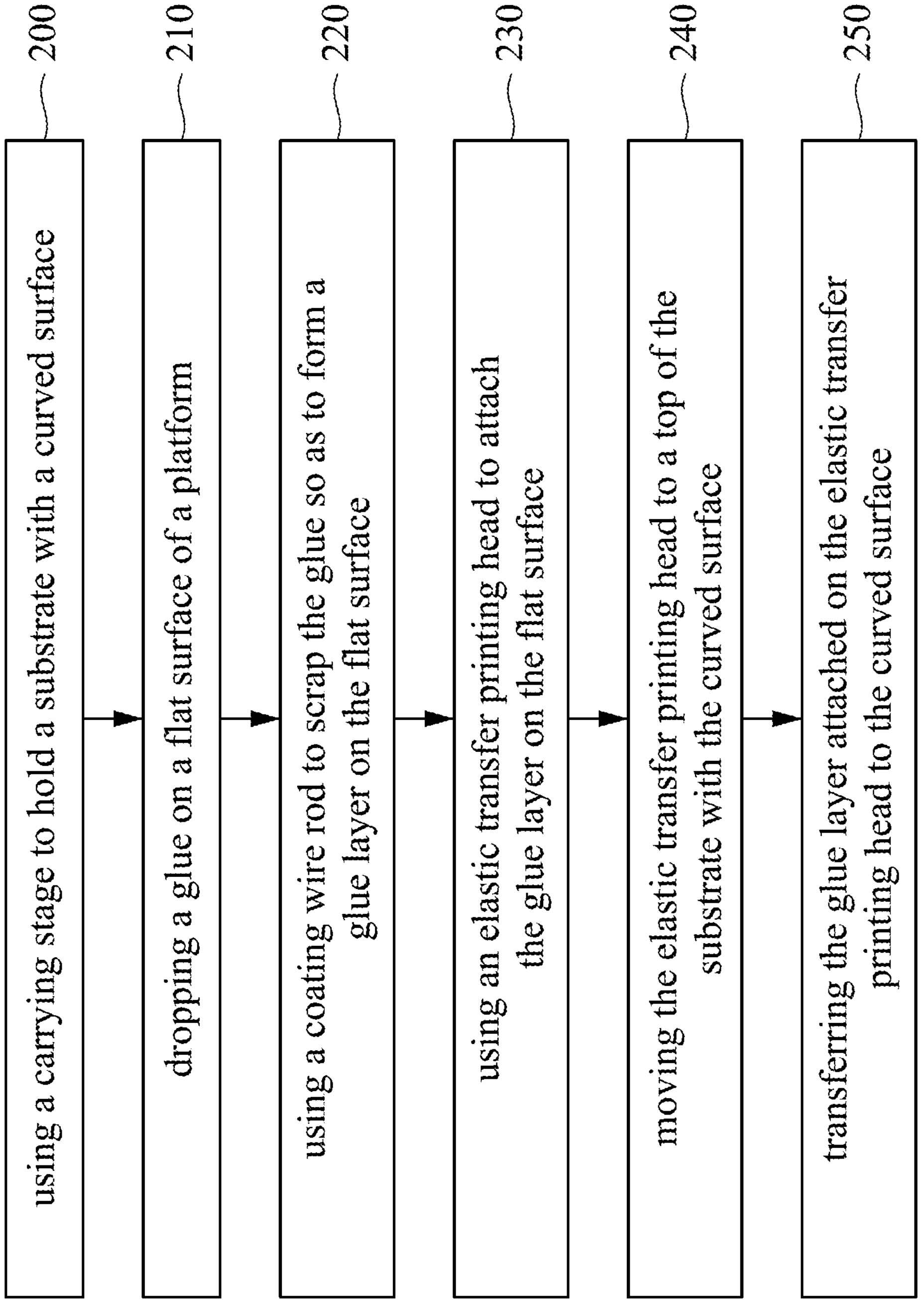
FIG. 3 is a flowchart of a coating method for a substrate with a curved surface in accordance with one embodiment of the present disclosure.

Referring to FIG. 2, FIG. 2 is a side view of a coating wire rod in accordance with one embodiment of the present disclosure. The coating wire rod 124 of the present embodiment includes a rod body **124*a* and a winding wire 124*b*. The rod body 124*a* may be disposed across the push frame 122. The winding wire 124*b* may be tightly wound on the rod body 124*a* without spacing, or may be wound on the rod body 124*a* with an interval. For example, the rod body 124*a* may be a steel rod, and the winding wire 124*b* may be a steel wire. The coating wire rod 124 has a gap H, and a thickness of the scraped glue layer can be precisely controlled by adjusting the gap H of the coating wire rod 124. In some examples, the gap H of the coating wire rod 124** is about 1 μm to about 20 μm.

The winding wire 124*b* of the coating wire rod 124 with different structures will also affect the thickness of the scraped glue layer. In an example of a flat bladed wire rod, the thickness of the glue layer is ½ of the gap H of the coating wire rod 124. In an example of a round-edged wire rod, the thickness of the glue layer is ⅔ of the gap H of the coating wire rod 124. In an example of sharp-edged wire rod, the thickness of the glue layer is equal to the gap H of the coating wire rod 124.

The coating wire rod 124 shown in FIG. 2 is a winding steel wire type, but the present disclosure is not limited thereto, and the present disclosure may also adopt a precision machining type wire rod.

In some examples, as shown in FIG. 1, the coating assembly 120 further includes a first driving device 126. The first driving device 126 is connected to the push frame 122 and can drive the push frame 122, such that the push frame 122 moves above the flat surface 112. Specifically, the first driving device 126 can drive the push frame 122 to move between the first side 112*a* and the second side 112*b* of the flat surface 112. The first driving device 126 may be, for example, a pneumatic cylinder. However, the present embodiment is not limited thereto, and the first driving device 126 may be other types of driving devices, such as a hydraulic cylinder.

In some examples, the coating assembly 120 further includes a down pressing bar 128. The down pressing bar 128 may be disposed across the push frame 122, and may be used to press down the coating wire rod 124 to fix the coating wire rod 124.

As shown in FIG. 1, the carrying stage 130 may be adjacent to the platform 110. For example, the carrying stage 130 may be adjacent to the first side 112*a* of the flat surface 112 to shorten a moving distance of the transfer printing assembly 140, but the present disclosure is not limited thereto. The carrying stage 130 can be used to hold a substrate with a curved surface to be coated. For example, the carrying stage 130 may be a vacuum stage for holding the substrate with the curved surface by a vacuum adsorption method. However, the carrying stage 130 may also fix the substrate with the curved surface by means of clamping or electrostatic adsorption, and the present disclosure is not limited thereto. In some examples, the carrying stage 130 is a cylindrical structure, and a diameter of the carrying stage 130 may be about 10 mm to about 500 mm. For example, the diameter of the carrying stage 130 may be about 10 mm to about 100 mm. However, the size of the carrying stage 130 can be adjusted according to practical operation requirements, and the present disclosure is not limited thereto.

As shown in FIG. 1, the transfer printing assembly 140 is disposed above the platform 110 and the carrying stage 130. The transfer printing assembly 140 may mainly include a carrier 142 and an elastic transfer printing head 144. The carrier 142 is located above the platform 110 and the carrying stage 130, and can move horizontally. The carrier 142 can be used to carry the elastic transfer printing head 144. In some examples, the transfer printing assembly 140 further includes a second driving device 146. The second driving device 146 is connected to the carrier 142 and can drive the carrier 142 to move horizontally, so as to drive the elastic transfer printing head 144 to move horizontally. The second driving device 146 may be, for example, a pneumatic cylinder. However, the second driving device 146 may also be other types of driving devices, such as a hydraulic cylinder, and the present disclosure is not limited thereto.

The elastic transfer printing head 144 is disposed on a bottom 142*a* of the carrier 142, and is located above the platform 110 and the carrying stage 130. The elastic transfer printing head 144 can move vertically, such that the elastic transfer printing head 144 can move toward the platform 110 or the carrying stage 130, or move away from the platform 110 or the carrying stage 130. The elastic transfer printing head 144 may first attach the glue layer on the flat surface 112 of the platform 110, and then move to the top of the carrying stage 130 to press against the curved surface of the substrate, so as to transfer the attached glue layer to the curved surface. The elastic transfer printing head 144 may be made of a material with good softness and elasticity, and good glue-absorbing ability. For example, the material of the elastic transfer printing head 144 may be rubber, silicone, or polyurethane, but the present disclosure is not limited thereto.

The hardness of the elastic transfer printing head 144 may be selected according to the viscosity of the glue. When the viscosity of the glue is greater, the elastic transfer printing head 144 with greater hardness may be selected, which is beneficial to press out the air in the glue and facilitates the exhaust of the glue. In some examples, when the viscosity of the glue is greater than 2000 mPa·s, the Shore A hardness of the elastic transfer printing head 144 is greater than 150, thereby facilitating the exhaust of the glue. In addition, the hardness of the elastic transfer printing head 144 is also related to the size of the substrate with the curved surface. When the size of the substrate with the curved surface is greater, the elastic transfer printing head 144 with smaller hardness may be selected, which can provide a better printing uniformity. In some examples, when the size of the substrate with the curved surface is greater than 4900 mm, the Shore A hardness of the elastic transfer printing head 144 is smaller than 50 to increase the transfer printing uniformity of the glue.

In some examples, the size and the shape of the elastic transfer printing head 144 substantially correspond to the size and the shape of the curved surface of the substrate, which is beneficial to squeeze out the air in the glue and prevent the air from remaining in the glue to degrade the quality. In some examples, the elastic transfer printing head 144 has a convex arc surface 144*a*, which is convenient for attaching glue and printing.

In some examples, the transfer printing assembly 140 further includes a third driving device 148. The third driving device 148 is disposed on the carrier 142 and connected to the elastic transfer printing head 144. The third driving device 148 can drive the elastic transfer printing head 144 to move vertically. The third driving device 148 may be, for example, a pneumatic cylinder. However, the third driving device 148 may also use other types of driving devices.

In some examples, the coating apparatus 100 for the substrate with the curved surface further includes a human-machine interface 150 for online workers to operate the coating apparatus 100 for the substrate with the curved surface. The human-machine interface 150 may include a screen 152 and plural operation buttons 154. The screen 152 may be used to display operation data. The operation buttons 154 may be electrically connected to the first driving device 126, the second driving device 146, and the third driving device 148 respectively. By pressing the operation buttons 154, the operations of the first driving device 126, the second driving device 146, and the third driving device 148 can be correspondingly controlled. The operation interface of the present embodiment is not limited to the aforementioned human-machine interface 150. For example, an interface such as a touch screen may also be used for the coating operation.

Referring to FIG. 3 and FIG. 4A to FIG. 4J, FIG. 3 is a flowchart of a coating method for a substrate with a curved surface in accordance with one embodiment of the present disclosure, and FIG. 4A to FIG. 4J are schematic diagrams showing a process of a coating method for a substrate with a curved surface in accordance with one embodiment of the present disclosure. The devices of the coating apparatus 100 for the substrate with the curved surface in FIG. 4A to FIG. 4J schematically represent the devices in FIG. 1. In the present embodiment, a substrate 300 with a curved surface may be coated by using the coating apparatus 100 for the substrate with the curved surface shown in FIG. 1. In some examples, when coating the substrate 300, an ambient temperature may be controlled to be less than 30 degrees Celsius, and a relative humidity of the environment may be controlled at about 40% to about 80%. However, the present disclosure is not limited thereto, and the ambient temperature and the relative humidity may be adjusted according to the requirements of the coating operation.

Figure 4A:
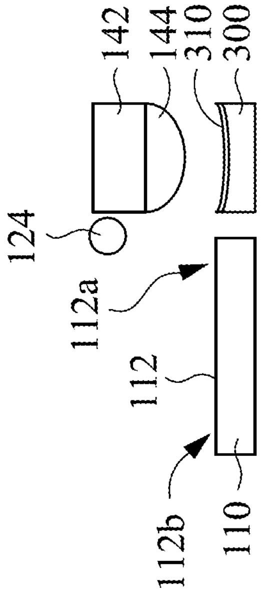
FIG. 4A to FIG. 4J are schematic diagrams showing a process of a coating method for a substrate with a curved surface in accordance with one embodiment of the present disclosure.

When coating, a step 200 may be first performed to place the substrate 300 on the carrying stage 130 in FIG. 1, and use the carrying stage 130 to hold the substrate 300. The substrate 300 has a curved surface 310 to be coated. In the present embodiment, as shown in FIG. 4A, the curved surface 310 of the substrate 300 is a concave arc surface. In some examples, the carrying stage 130 holds the substrate 300 by vacuum adsorption, and a vacuum value of the carrying stage 130 is controlled to be greater than −65 kPa. When the vacuum value of the carrying stage 130 is not greater than −65 kPa, the carrying stage 130 cannot effectively hold the substrate 300, which results in inconsistent thickness and poor uniformity of the coating layer, thereby degrading product quality.

Figure 4B:
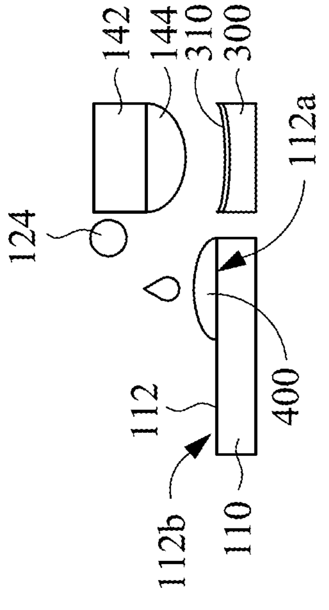

Next, a step 210 may be performed to drop a preset amount of glue 400 on the flat surface 112 of the platform 110. For example, the glue 400 may be dropped on the first side 112*a* of the flat surface 112, as shown in FIG. 4B.

Figure 4C:
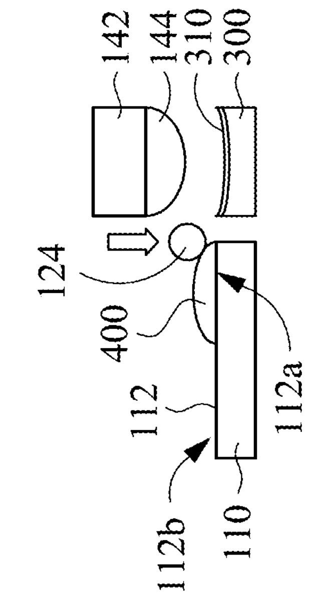
Figure 4D:
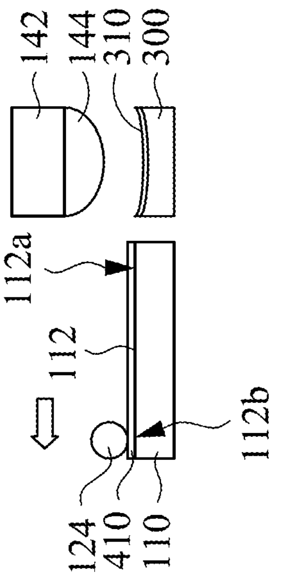

Then, referring to FIG. 1, FIG. 4C, and FIG. 4D simultaneously, a step 220 may be performed to use the coating wire rod 124 to scrape the glue 400 from the first side 112*a* of the flat surface 112 to the second side 112*b* to form a glue layer 410 on the flat surface 112. The glue layer 410 formed by scraping with the coating wire rod 124 has a uniform thickness. When scraping the glue 400, the first driving device 126 may be activated to drive the push frame 122, and the push frame 122 further drives the coating wire rod 124, such that the coating wire rod 124 rolls from the first side 112*a* of the flat surface 112 to the second side 112*b*.

A moving speed of the coating wire rod 124 may be adjusted according to the viscosity of the glue 400. In some examples, when using the coating wire rod 124 to scrape the glue 400, the moving speed of the coating wire rod 124 is controlled at about 0.1 mm/s to about 30 mm/s. When the moving speed of the coating wire rod 124 is within this range, the thickness of the glue layer 410 is consistent with good thickness uniformity.

Figure 4E:
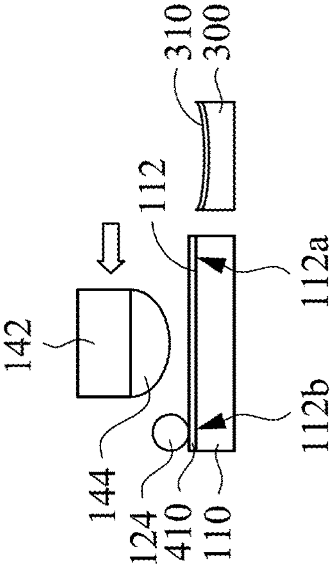
Figure 4F:
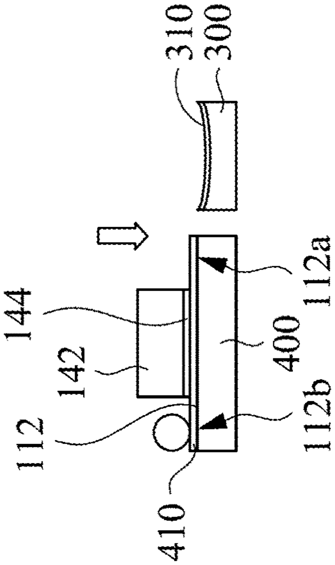
Figure 4G:
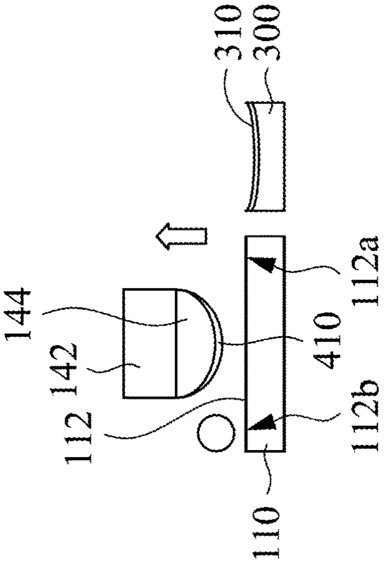

When the coating wire rod 124 is located on the second side 112*b*, a step 230 may be performed to use the elastic transfer printing head 144 to attach the glue layer 410 on the flat surface 112. Referring to FIG. 1 together, when the step 230 is performed, the second driving device 146 may be first activated to drive the carrier 142 and the elastic transfer printing head 144 to move above the glue layer 410, as shown in FIG. 4E. Then, the third driving device 148 is activated to drive the elastic transfer printing head 144 downward to attach the glue layer 410, as shown in FIG. 4F. A dipping speed of the elastic transfer printing head 144 may be adjusted according to the hardness of the elastic transfer printing head 144 and the viscosity of the glue layer 410. In some examples, the dipping speed of the elastic transfer printing head 144 may be controlled at about 0.1 cm/s to about 10 cm/s, so as to enhance the consistency of the thickness of the glue layer 410 attached to the elastic transfer printing head 144. Subsequently, the third driving device 148 drives the elastic transfer printing head 144 attached with the glue layer 410 to move upward, as shown in FIG. 4G.

A vertical moving speed of the elastic transfer printing head 144 attached with the glue layer 410 may be adjusted according to the viscosity of the glue layer 410 and the hardness of the elastic transfer printing head 144. In some examples, the vertical moving speed of the elastic transfer printing head 144 may be controlled at about 0.1 mm/s to about 30 mm/s, so as to maintain the thickness uniformity of the glue layer 410 on the elastic transfer printing head 144.

Figure 4H:
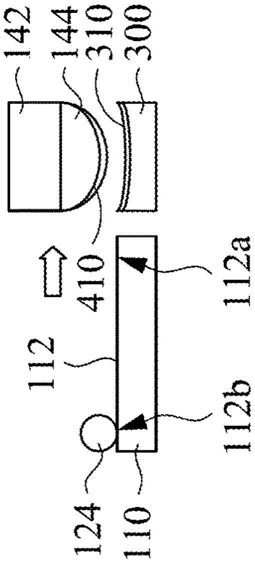

Next, as shown in FIG. 4H, a step 240 may be performed to use the second driving device 146 to drive the carrier 142, so as to horizontally move the elastic transfer printing head 144 attached with the glue layer 410 to the top of the curved surface 310 of the substrate 300. A horizontal moving speed of the elastic transfer print head 144 attached with the glue layer 410 may also be adjusted according to the viscosity of the glue layer 410 and the hardness of the elastic transfer printing head 144. In some examples, the horizontal moving speed of the elastic transfer printing head 144 may be controlled at about 0.1 mm/s to about 30 mm/s, so as to maintain the thickness uniformity of the glue layer 410 on the elastic transfer printing head 144.

Figure 4I:
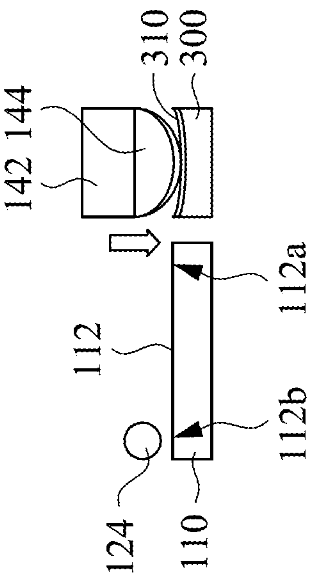

Subsequently, as shown in FIG. 4I, a step 250 may be performed to use the third driving device 148 to drive the elastic transfer printing head 144 to move down to press against the curved surface 310 of the substrate 300, so as to transfer the glue layer 410 attached on the elastic transfer printing head 144 to the curved surface 310. In some examples, when transferring the glue layer 410 on the elastic transfer printing head 144 to the curved surface 310, the third driving device 148 may apply a downward air pressure to the elastic transfer printing head 144. The downward air pressure may be, for example, about 4 $kgf/cm^2$ to about 6 $kgf/cm^2$. The transferring speed for transferring the glue layer 410 on the elastic transfer printing head 144 to the curved surface 310 may be adjusted according to the viscosity of the glue layer 410, the hardness of the elastic transfer printing head 144, and the curvature of the curved surface 310 of the substrate 300. The smaller the curvature of the curved surface 310 is, the slower the pressing speed of the elastic transfer printing head 144 is, which can enhance the uniformity of the transferred glue layer 410. In some examples, the transferring speed of the elastic transfer printing head 144 may be controlled at about 0.1 mm/s to about 10 mm/s, such that the thickness of the transferred glue layer 410 has good uniformity.

Figure 4J:
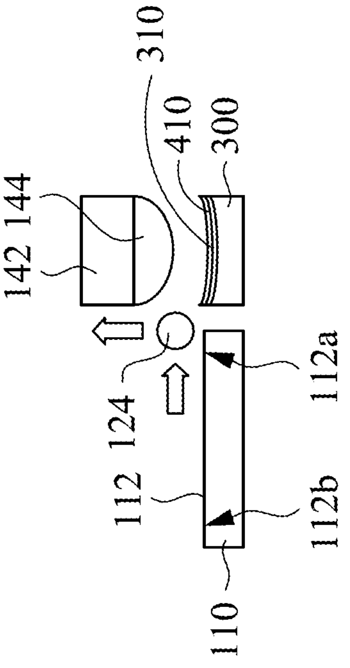

Then, as shown in FIG. 4J, after the glue layer 410 is transferred to the curved surface 310, the elastic transfer printing head 144 is driven to move vertically upwards to return to its original position by using the third driving device 148. At the same time, the push frame 122 is driven by using the first driving device 126 to drive the coating wire rod 124 to return to its original position.

The coating method for a substrate with a curved surface of the present disclosure may also be applied to the coating of substrates with convex arc surfaces. Referring to FIG. 5A to FIG. 5E, FIG. 5A to FIG. 5E are schematic diagrams showing a process of a coating method for a substrate with a curved surface in accordance with another embodiment of the present disclosure. In the present embodiment, a substrate 500 with a curved surface may be coated by using the coating apparatus 100 for the substrate with the curved surface shown in FIG. 1. Similarly, the devices of the coating apparatus 100 for the substrate with the curved surface in FIG. 5A to FIG. 5E schematically represent the devices in FIG. 1. When coating the substrate 500, an ambient temperature may be controlled to be less than 30 degrees Celsius, and a relative humidity of the environment may be controlled at about 40% to about 80%.

Figure 5A:
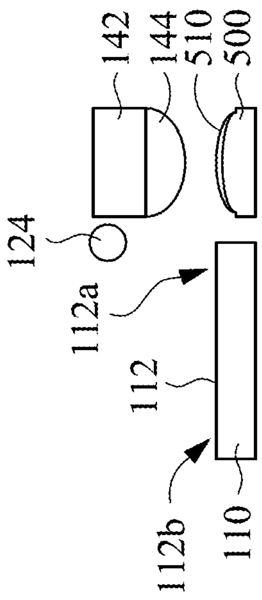
FIG. 5A to FIG. 5E are schematic diagrams showing a process of a coating method for a substrate with a curved surface in accordance with another embodiment of the present disclosure.

When coating, the substrate 500 is first placed on the carrying stage 130 in FIG. 1, and is held by the carrying stage 130. As shown in FIG. 5A, in the present embodiment, the curved surface 510 of the substrate 500 is a convex arc surface. In some examples, the carrying stage 130 holds the substrate 500 by vacuum adsorption, and a vacuum value of the carrying stage 130 is greater than −65 kPa.

Figure 5B:
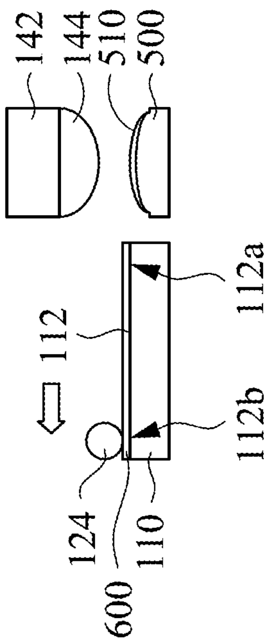

Next, as shown in FIG. 5B, a glue layer 600 may be formed on the flat surface 112 of the platform 110. In the operation of forming the glue layer 600, a preset amount of glue may be first dropped on the flat surface 112 of the platform 110, for example, on the first side **112*a* of the flat surface 112. The glue is scraped from the first side 112*a* of the flat surface 112 to the second side 112*b* by using the coating wire rod 124, so as to form the glue layer 600 with a uniform thickness on the flat surface 112. The designs of the scraping operation of the coating wire rod 124** on the glue and its moving speed are the same as those in the aforementioned embodiment, and will not be repeated here.

Figure 5E:
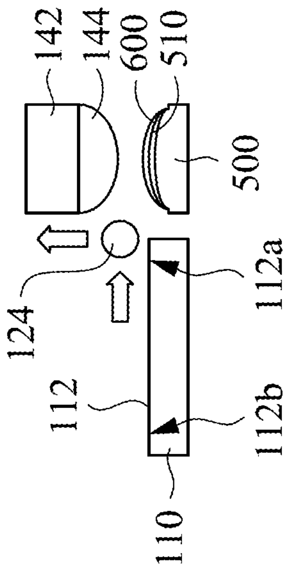
Figure 5C:
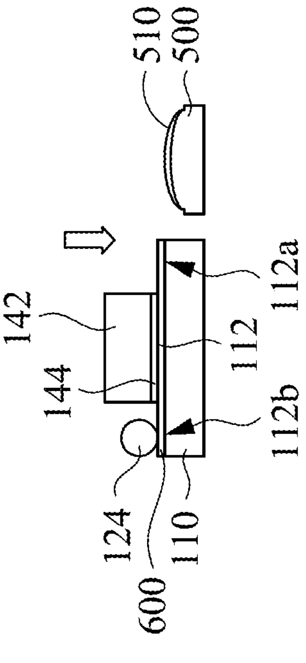

Then, as shown in FIG. 5C, the carrier 142 and the elastic transfer printing head 144 may be driven to move above the glue layer 600 by using the second driving device 146, and then the elastic transfer printing head 144 may be driven downward to attach the glue layer 600 by using the third driving device 148. The dipping speed of the elastic transfer printing head 144, and the vertical moving speed and the horizontal moving speed of the elastic transfer printing head 144 attached with the glue layer 600 are the same as those in the aforementioned embodiment, and will not be repeated here.

Figure 5D:
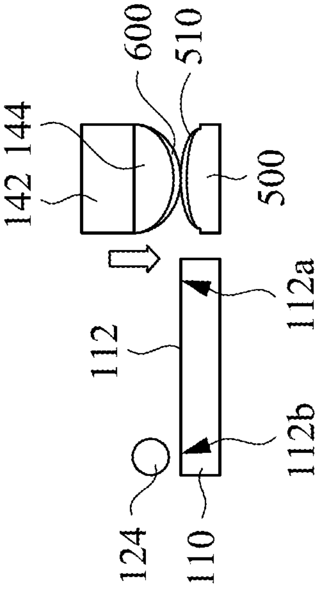

Then, the carrier 142 is driven by the second driving device 146 to horizontally move the elastic transfer printing head 144 attached with the glue layer 600 to the top of the curved surface 510 of the substrate 500. As shown in FIG. 5D, the elastic transfer printing head 144 is driven to move down to press against the curved surface 510 by using the third driving device 148, so as to transfer the glue layer 600 attached on the elastic transfer printing head 144 to the curved surface 510. In the transferring operation, the air pressure applied to the elastic transfer printing head 144 and the transferring speed are the same as those in the aforementioned embodiment, and will not be repeated here.

As shown in FIG. 5E, after the glue layer 600 is transferred to the curved surface 510, the elastic transfer printing head 144 and the coating wire rod 124 are driven back to their original positions by using the third driving device 148 and the first driving device 126 respectively.

According to the aforementioned embodiments, the coating wire rod of the present disclosure can control the thickness of the glue layer, such that the thickness of the glue layer for each transfer can be consistent. In addition, the elastic transfer printing head can attach the glue layer formed by the coating wire rod, and can transfer the attached glue layer to the curved surface of the substrate smoothly. Therefore, the present disclosure can achieve coating operations on the substrate with the curved surface, such as a convex surface and a concave surface, and has advantages of high utilization of the glue and good uniformity of the glue layer.

Although the present disclosure has been disclosed above with embodiments, it is not intended to limit the present disclosure. Any person having ordinary skill in the art can make various changes and modifications without departing from the spirit and scope of the present disclosure. Therefore, the protection scope of the present disclosure should be defined by the scope of the appended claims.

What is claimed is:

1. A coating apparatus for a substrate with a curved surface, comprising:
- a platform having a flat surface;
- a coating assembly adjacent to the platform, wherein the coating assembly comprises:
  - a push frame disposed on the platform; and
  - a coating wire rod disposed on the push frame, wherein the push frame is configured to push the coating wire rod to scrape a glue on the flat surface so as to form a glue layer on the flat surface;
- a carrying stage adjacent to a first side of the flat surface and configured to hold the substrate with the curved surface; and
- a transfer printing assembly comprising:
  - a carrier horizontally movable above the platform and the carrying stage; and
  - an elastic transfer printing head disposed on a bottom of the carrier and vertically movable, and configured to attach the glue layer on the flat surface and press against the curved surface of the substrate to transfer the attached glue layer to the curved surface.

2. The coating apparatus of claim 1, wherein a gap of the coating wire rod is 1 μm to 20 μm.

3. The coating apparatus of claim 1, wherein the coating assembly further comprises a first driving device, and the first driving device is connected to the push frame and is configured to drive the push frame to move above the flat surface.

4. The coating apparatus of claim 3, wherein the first driving device is a pneumatic cylinder.

5. The coating apparatus of claim 1, wherein the carrying stage is a vacuum stage.

6. The coating apparatus of claim 1, wherein a size and a shape of the elastic transfer printing head substantially correspond to a size and a shape of the curved surface of the substrate.

7. The coating apparatus of claim 1, wherein the elastic transfer printing head has a convex arc surface.

8. The coating apparatus of claim 1, wherein a material of the elastic transfer printing head is rubber, silicone, or polyurethane.

9. The coating apparatus of claim 1, wherein the transfer printing assembly further comprises:
- a second driving device connected to the carrier, and configured to drive the carrier to drive the elastic transfer printing head; and
- a third driving device disposed on the carrier and connected to the elastic transfer printing head, wherein the third driving device is configured to drive the elastic transfer printing head to move vertically.

10. The coating apparatus of claim 9, wherein each of the second driving device and the third driving device is a pneumatic cylinder.

11. A coating method for a substrate with a curved surface, comprising:

using a carrying stage to hold the substrate with the curved surface;

dropping a preset amount of a glue on a first side of a flat surface of a platform, wherein the first side of the flat surface is adjacent to the carrying stage;

using a coating wire rod to scrap the glue from the first side of the flat surface to a second side, which is opposite to the first side, so as to form a glue layer on the flat surface;

using an elastic transfer printing head to attach the glue layer on the flat surface;

moving the elastic transfer printing head attached with the glue layer to a top of the substrate; and pressing the elastic transfer printing head against the curved surface of the substrate, so as to transfer the glue layer attached on the elastic transfer printing head to the curved surface.

12. The coating method of claim 11, wherein using the carrying stage to hold the substrate further comprises using a vacuum adsorption method to hold the substrate, and controlling a vacuum value of the carrying stage to be greater than −65 kPa.

13. The coating method of claim 11, wherein using the coating wire rod to scrap the glue comprises controlling the coating wire rod to move at a speed of 0.1 mm/s to 30 mm/s.

14. The coating method of claim 11, wherein using the elastic transfer printing head to attach the glue layer on the flat surface comprises controlling a dipping speed at 0.1 cm/s to 10 cm/s.

15. The coating method of claim 11, wherein moving the elastic transfer printing head attached with the glue layer to the top of the substrate comprises controlling a horizontal moving speed of the elastic transfer printing head at 0.1 mm/s to 30 mm/s.

16. The coating method of claim 11, wherein moving the elastic transfer printing head attached with the glue layer to the top of the substrate comprises controlling a vertical moving speed of the elastic transfer printing head at 0.1 mm/s to 30 mm/s.

17. The coating method of claim 11, wherein transferring the glue layer attached on the elastic transfer printing head to the curved surface comprises controlling a transferring speed of the elastic transfer printing head at 0.1 cm/s to 10 cm/s.

18. The coating method of claim 11, wherein transferring the glue layer attached on the elastic transfer printing head to the curved surface comprises applying a downward air pressure to the elastic transfer printing head, and the downward air pressure is 4 $kgf/cm^2$ to 6 $kgf/cm^2$.

19. The coating method of claim 11, wherein when a viscosity of the glue is greater than 2000 mPa·s, a Shore A hardness of the elastic transfer printing head is greater than 150.

20. The coating method of claim 11, wherein when a size of the substrate is greater than 4900 mm, a Shore A hardness of the elastic transfer printing head is smaller than 50.

21. The coating method of claim 11, wherein performing the coating method comprises controlling an ambient temperature to be less than 30 degrees Celsius, and a relative humidity of 40% to 80%.

* * * * *